(12) United States Patent
Krone-Schmidt

(10) Patent No.: US 6,173,916 B1
(45) Date of Patent: Jan. 16, 2001

(54) $CO_2$ JET SPRAY NOZZLES WITH MULTIPLE ORIFICES

(75) Inventor: Wilfried Krone-Schmidt, Fullerton, CA (US)

(73) Assignee: Eco-Snow Systems, Inc., Livermore, CA (US)

( * ) Notice: Under 35 U.S.C. 154(b), the term of this patent shall be extended for 0 days.

(21) Appl. No.: 09/157,094

(22) Filed: Sep. 18, 1998

Related U.S. Application Data

(63) Continuation-in-part of application No. 08/804,450, filed on Feb. 21, 1997, now abandoned, which is a continuation-in-part of application No. 08/356,606, filed on Dec. 15, 1994, now abandoned.

(51) Int. Cl.[7] .................................................. B05B 7/00
(52) U.S. Cl. ................................................ 239/590.3
(58) Field of Search .......................... 239/590, 590.3, 239/600, 393, 396

(56) References Cited

U.S. PATENT DOCUMENTS

| | | | |
|---|---|---|---|
| 3,630,455 | * 12/1971 | Parkison | 239/590.3 |
| 4,426,040 | * 1/1984 | Smith | 239/590.3 |
| 4,806,171 | 2/1989 | Whitlock et al. | |
| 4,962,891 | 10/1990 | Layden | |
| 5,018,667 | 5/1991 | Lloyd | |

FOREIGN PATENT DOCUMENTS

| | | | |
|---|---|---|---|
| 4016368 | 12/1990 | (DE) | |
| 4331496 | 4/1994 | (DE) | |
| 528635 | * 11/1940 | (GB) | 239/396 |
| 24095441 | 9/1974 | (GB) | |
| 2048721 | 12/1980 | (GB) | |

* cited by examiner

Primary Examiner—Matthew C. Graham
(74) Attorney, Agent, or Firm—R. Craig Armstrong

(57) ABSTRACT

A $CO_2$ jet spray nozzle comprising multiple nozzle orifices for use in producing $CO_2$ jet spray. The nozzle comprises a body, an elongated nozzle tube extending from the body having an axial hole therein, and an orifice disk disposed at the base of the nozzle tube in the axial hole. The orifice disk contains a plurality of orifices disposed therein that form a critical orifice and that is an integral part of the nozzle. The orifices may be drilled by means of a laser beam or electron discharge machining through the orifice disk. The orifice disk and nozzle tube are typically welded together to prevent leakage. By fabricating different nozzles in which the orifice size, orifice geometry (round, oval, or elongated slit), total orifice area, nozzle diameter and nozzle length is varied within a well defined matrix, any intensity of $CO_2$ jet spray may be obtained. By varying the arrangement of the orifices, nozzle geometry, and nozzle length, different spray patterns may be provided. Both circular and linear orifice patterns are disclosed that provide circular and elongated spray patterns. The linear jet spray nozzle may contain multiple orifices with different dimensions or a changing density of orifices.

20 Claims, 2 Drawing Sheets

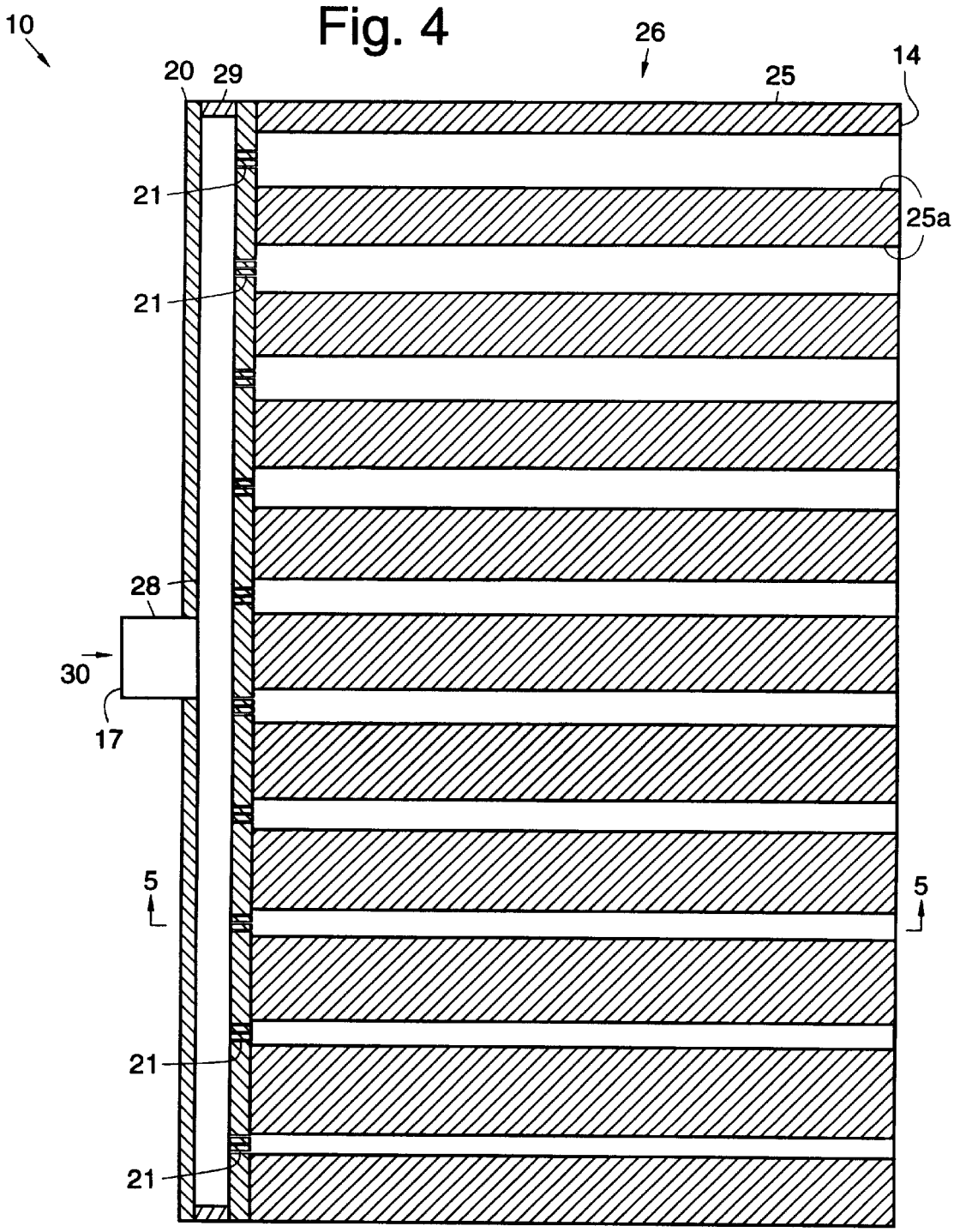
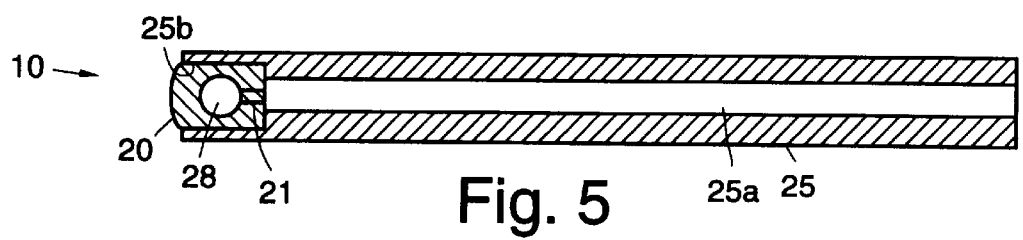

$CO_2$ JET SPRAY NOZZLES WITH MULTIPLE ORIFICES

REFERENCE TO RELATED APPLICATIONS

This is a continuation-in-part of application Ser. No. 08/804,450, filed Feb. 21, 1997, now abandoned, which was a continuation-in-part of application Ser. No. 08/356,606, filed Dec. 15, 1994, also abandoned.

BACKGROUND OF THE INVENTION

1. Field of the Invention

The present invention relates to $CO_2$ jet spray nozzles, and more particularly, to $CO_2$ jet spray nozzles having multiple orifices.

2. Description of Related Art

The related prior art of $CO_2$ jet spray nozzles is believed to involve the use of a variable orifice. Despite much literature on the subject, this aspect has not been well explained or documented. Exact geometries of the nozzles vary and can be considered proprietary by each manufacturer. Fixed orifice nozzles are disclosed in U.S. Pat. No. 4,806,171, issued to Whitlock et al., and U.S. Pat. No. 4,962,891, issued to Layden. In each case a set of two (consecutive) orifices is given as essential to good jet spray (snow) production. In both cases the source of $CO_2$ is in gaseous form, and in that case two consecutive orifices appear to be needed. However, expanding $CO_2$ gas is inefficient and does not have the aggressiveness of $CO_2$ jet spray from liquid. In using liquid $CO_2$, two consecutive orifices are detrimental to snow production since the second orifice frequently clogs and causes sputtering of the $CO_2$ jet spray.

Therefore, it is an objective of the present invention to provide for improved $CO_2$ jet spray nozzles that overcome the problems of conventional $CO_2$ jet spray nozzles.

SUMMARY OF THE INVENTION

The production of a $CO_2$ jet spray requires an orifice to generate snow, and a nozzle to shape, control, and direct snow to a surface. In order to meet the above and other objectives, the present invention provides for nozzles for use in producing $CO_2$ jet spray, these nozzles having multiple orifices. In the present invention, a pattern of orifices forms a critical orifice, which is an integral part of the nozzle. By fabricating different nozzles in which orifice size, orifice geometry (round, oval, or elongated slit), total orifice area, nozzle diameter and nozzle length is varied within a well-defined matrix, any desired intensity of $CO_2$ jet spray may be obtained. By varying the arrangement of the orifices, nozzle geometry, and nozzle length, different spray patterns may be provided.

More particularly, the $CO_2$ jet spray nozzle of the present invention comprises a body, an elongated nozzle tube extending from the body, and an orifice disk disposed in the nozzle tube adjacent the body that has a plurality of orifices disposed therein. The orifices are formed by any suitable means such as laser drilling through the orifice disk, or by means of electron discharge machining (EDM), for example. The body has an input aperture that mates with a source of $CO_2$ and an elongated tube extending toward an output end. The body has a first axial hole of a predetermined depth disposed along an axis of the body adjacent the output end, and a centrally located second axial hole having a diameter that may be different than the diameter of the first axial hole disposed through the remaining length of the body. The orifice disk is disposed at the bottom of the first axial hole and has a circular input aperture that couples $CO_2$ to the plurality of orifices. The elongated nozzle tube is disposed in the first axial hole so that it abuts the orifice disk and protrudes a predetermined length in front of the body. The orifice disk may have a circular pattern of orifices that provide a circular $CO_2$ spray pattern. The orifice disk and nozzle tube are typically welded together to prevent leakage.

The present invention also contemplates a linear jet spray nozzle that contains multiple orifices each with different dimensions or one that uses a changing density of orifices, such that it starts out on one side of the nozzle with a large number of orifices per linear inch, and gradually changes to a relatively small number of orifices per inch on the opposite side.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 4 shows an enlarged cross-sectional top view of a portion of a linear jet spray nozzle corresponding to that shown in FIG. 3a; and FIG. 5 is a cross-sectional side view of the nozzle of FIG. 4 taken along the line 5—5.

DESCRIPTION OF THE PREFERRED EMBODIMENTS

Figure 1:
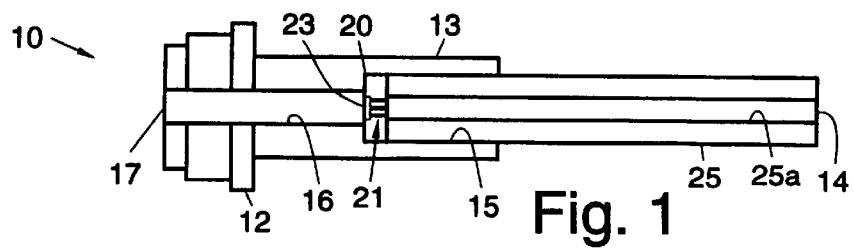
FIG. 1 illustrates a cross-sectional view of a $CO_2$ jet spray nozzle having multiple orifices in accordance with the principles of the present invention.

Referring to the drawings, FIG. 1 illustrates a cross-sectional view of a $CO_2$ jet spray nozzle 10 having multiple orifices 21, or a multiple orifice nozzle 10, in accordance with the principles of the present invention. The multiple orifice nozzle 10 is comprised of a body 12 that comprises a metal gasket seal fitting 12 having an input aperture 17 that mates with a source 30 of $CO_2$. The metal gasket seal fitting 12 is commercially available from Cajon, for example, part number SS-4-VCR-3, for example. The body 12 or fitting 12 has an elongated tube 13 extending toward an output end 14 of the nozzle 10. A first axial hole 15 is formed to a predetermined depth along the axis of the body 12 adjacent the output end 14 of the nozzle. A centrally located second axial hole 16 having a diameter that is smaller than the diameter of the first axial hole 15 is disposed through the remaining length of the body 12. Thus the body 12 has an axially disposed hole formed therethrough that has a smaller diameter adjacent an input end of the nozzle 10 and a larger diameter adjacent the output end 14 of the nozzle 10.

An orifice disk 20 or orifice button 20 is disposed adjacent to the bottom of the first axial hole 15 and has a plurality of small orifices 21 therein. The orifice disk 20 has a circular input aperture 23 disposed at an input end thereof. A series of round orifices 21, for example, may be laser drilled through the central portion of the orifice disk 20 and within the diameter of the input aperture 23 in a predetermined pattern. Alternatively, the orifices 21 may be formed by means of electron discharge machining (EDM), for example. An elongated nozzle tube 25 having an outer diameter slightly less that the internal diameter of the first axial hole 15 is disposed in the first axial hole 15 so that it abuts the orifice disk 20 and is welded in place along the length of the first axial hole 15. The nozzle tube 25 protrudes about two-thirds of its length in front of the body 12. The nozzle tube 25 has an opening 25a disposed therethrough that provides an opening between the plurality of small orifices 21 of the orifice disk 20 and the output end 14 of the nozzle 10 through which carbon dioxide is sprayed.

The orifice disk 20 and nozzle tube 25 are fabricated in two parts and then welded together to fix the nozzle geometry and to prevent leakage. The present multiple orifice nozzle 10 disclosed herein was fabricated to clean cutting tools prior to nitriding. The pattern of orifices 21 forms a critical orifice, which is an integral part of the nozzle 10. By fabricating different nozzles 10 that comprise different orifice disks 20 in which orifice size, orifice geometry (round, oval, or elongated slit), total orifice area, nozzle diameter and nozzle length is varied within a well defined matrix, any intensity of $CO_2$ jet spray may be obtained. By varying the arrangement of the orifices 21, nozzle geometry, and nozzle length, different spray patterns may be provided.

Figure 2A:
FIG. 2a is a cross-sectional view of the orifice disk employed in the $CO_2$ jet spray nozzle of FIG. 1.
Figure 2B:
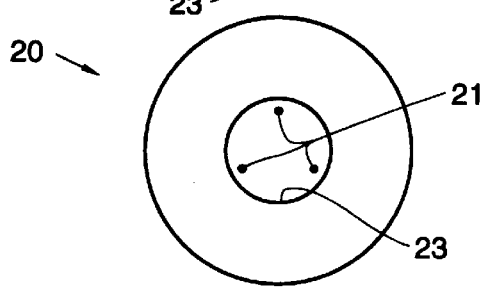
FIGS. 2b–2d show several orifice patterns that may be employed in the $CO_2$ jet spray nozzle of FIG. 1.
Figure 2C:
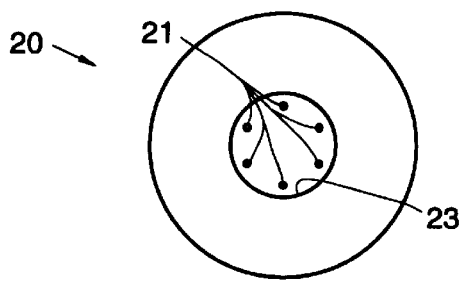
Figure 2D:
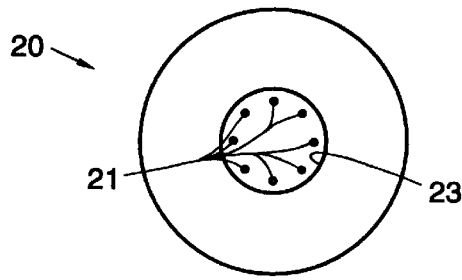

FIGS. 2a–2d illustrate exemplary embodiments of the orifice disk 20. FIG. 2a shows a cross-sectional view of the orifice disk 20. Several typical orifice patterns that may be formed in the orifice disk 20 are shown in FIGS. 2b–2d. FIG. 2b shows a disk 20 having three orifices 21. The orifice 21 may have a 0.003 inch diameter, a 0.005 inch diameter, or a 0.008 inch diameter, for example. FIG. 2c shows a disk 20 having six orifices 21 each having a 0.003 inch, a 0.005 inch, or a 0.008 inch diameter. FIG. 2d shows a disk 20 having eight orifices 21 each having a 0.003 inch, a 0.005 inch, or a 0.008 inch diameter. FIG. 2d shows the disk 20 with eight orifices 21 that was used in a specific embodiment of the nozzle 10 for which the present invention was conceived.

Thus, the orifice disks 20 illustrated by FIGS. 2a–2d represent nine different orifice disks 20 that were fabricated, having orifices 21 of 0.003 inch, 0.005 inch and 0.008 inch diameters. Although a circular jet spray pattern is normally not generated using an orifice disk 20 that contains several holes with different diameters, it is to be understood that different spray patterns may readily be produced by appropriately selecting orifices 21 of different diameters and using them in one orifice disk 20.

By way of example, to provide a circular spray pattern, a circular pattern of orifices 21 is used. With regard to the application for which the present invention was developed, a fine $CO_2$ snow spray was desired, and therefore 0.003 inch diameter orifices 21 were used. The spray distance required a total orifice area of $6 \times 10^{-5}$ square inches, and therefore 8 orifices 21 were required. A footprint of 0.125 inches was considered optimum and when used with multiple orifice nozzle 10 having a 0.125 inch internal diameter for the first axial hole 15, a circular pattern of 8 holes were drilled around a 0.06 inch diameter circle. Finally, tight control of the $CO_2$ spray pattern was achieved by separating the orifice disk 20 and the exit of the nozzle 10 by a distance of 1.5 inches. The orifice density of the above-described round or circular jet spray nozzle 10 typically varies from 1000 orifices per square inch (3 orifices 21 in a 0.0625" diameter) to 2600 per square inch (8 orifices 21 in a 0.0625" diameter).

The above described multiple orifice nozzle 10 was fabricated and tested and it was determined that it cleaned as well as a variable orifice nozzle operated at an equivalent setting. During extensive tests, the above-described multiple orifice nozzle 10 was able to clean fixtures to zero particles per item in a robotic system.

Figure 3A:
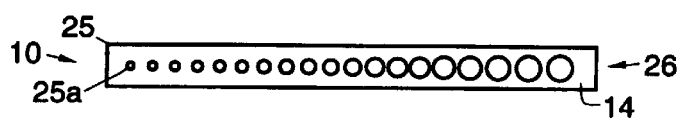
FIGS. 3a and 3b show representations of linear nozzles having multiple orifices each with different dimensions.
Figure 3B:
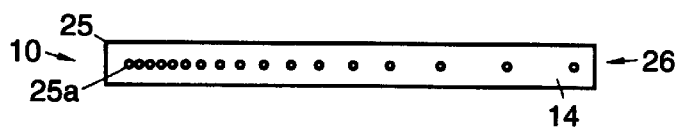
Figure 3C:
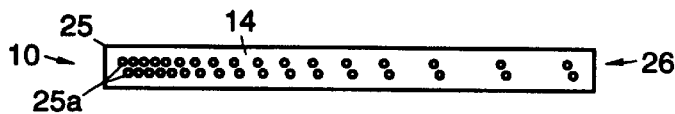
FIG. 3c shows a representation of a linear nozzle having a changing density of orifices.

The present invention also contemplates a linear jet spray nozzle 10 that contains multiple orifices 21 each with different dimensions. FIG. 3a shows part of a end view of a representation of this type of linear nozzle 10. Another design for the linear nozzle 10 uses a changing density of orifice disks 20 and nozzle tubes 25, examples of which are illustrated in FIGS. 3b and 3c. FIG. 3b shows part of an end view of a nozzle 10 having a single row 26 of orifice disks 20 and nozzle tubes 25, while FIG. 3c shows part of an end view of a nozzle 10 having a plurality of rows 26 of orifice disks 20 and nozzle tubes 25. The nozzles 10 of FIGS. 3b and 3c start out on one side with 100 orifice disks 20 and nozzle tubes 25 per (linear) inch, for example, and gradually change to about 25 orifice disks 20 and nozzle tubes 25 per inch, for example, on the opposite side of the nozzle 10.

FIG. 4 shows an enlarged cross-sectional top view of a portion of a linear jet spray nozzle 10 corresponding to that shown in FIG. 3a, and FIG. 5 is a cross-sectional side view of the nozzle 10 of FIG. 4. The nozzle 10 has a manifold 28 at its rear end that is coupled to the source 30 of $CO_2$ by way of an inlet 17, which may be a common gas fitting, for example. The manifold 28 is sealed at both ends by means of welds 29, for example. The manifold 28 has sets of orifices 21 drilled in its front end that are aligned with a corresponding plurality of openings 25a formed in a linear nozzle tube 25. In this embodiment, each of the openings 25a are laser drilled through a block of metal to form the linear nozzle tube 15. The manifold 28 is pressed into a groove 25b formed at the rear end of the linear nozzle tube 25. Carbon dioxide is supplied by way of the inlet 17 and manifold 28 to each of the orifices 21 which in turn produce different spray patterns that are a function of the diameters of the respective openings 25a in the linear nozzle tube 25. This type of nozzle 10, as well as the other linear jet spray nozzles 10 shown in FIGS. 3b and 3c, are able to generate $CO_2$ spray patterns that are nonparallel to a surface that is to be cleaned, as well a provide variable force cleaning, such as to clean articles having grooves and flat surfaces, for example. Of course, it should be clear that the orifices could be all of the same size and equally spaced. The variations of FIGS. 3a–3c are simply to show that that is not necessarily the case.

The present invention improves upon single orifice nozzles that generate $CO_2$ snow. The first advantage of using a plurality of small orifices 21 is the ability to generate a smaller snow flake size while maintaining an output jet spray pressure required to provide precision cleaning. The second advantage is the ability to increase the output pressure far beyond the capacity of a nozzle that employs a single orifice. By laser beam drilling or electron discharge machining the plurality of orifices 21, more advantages are provided. The ability to fine-tune the nozzle 10 to provide certain operating parameters is provided by using a focused laser beam or electron discharge machining to increase the hole diameter by a fraction of a one thousandth of an inch, for example. Furthermore, a single orifice 21 is as easily drilled as two or more orifices 21 using the laser beam or EDM, thus providing an economic advantage with respect to fabrication of the nozzle 10. The orifice pattern need not comprise single-size orifices 21, and by varying the sizes of the orifices 21 within the nozzle 10, distribution of the snow flakes can be favorably changed to more desirable parameters. Finally, a multitude of spray patterns may be generated using the present invention including a simple point spray, a fan spray, axial or radial sprays, or other patterns conforming to complex geometric spray patterns depending upon the particular orifice disk 20 that is selected.

Thus there has been described new $CO_2$ jet spray nozzles having multiple orifices. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

For example, as explained above, the shape and distribution of the orifices may vary. It is not the shape and distribution of the orifices which results in the desired pressure drop, as much as it is their very small size. In referring to their size, the term "maximum" diameter is used, when intended to cover the situation where the orifices are not necessarily circular. The tiny orifice size results in the pressure drop which creates the desired snow quality. Relatively large orifice sizes could not be used effectively to produce $CO_2$ snow, since the orifices would be too large to create the required pressure drop and tiny droplets. Large orifices may be used to break a fluid flow into individual streams, as in a water shower, if the pressure drop across the orifice is not too large. Small orifices as in the present invention generate a significant pressure drop and an aerosol with tiny droplets. Immediately past the orifice, the unique thermodynamic properties of carbon dioxide allow the tiny droplets to freeze into small snow particles. While liquid $CO_2$ may enter the orifices, the tremendous pressure drop at the exit side of the orifices simply does not allow liquid $CO_2$ to exist. The expansion of liquid $CO_2$ causes a rapid rate of cooling, which generates solid $CO_2$ and gaseous $CO_2$. This is quite different from what would happen with the much larger orifice sizes.

It should also be understood that several nozzles of the FIG. 1 type could be arranged together in a row or any other desired pattern. They could be mounted separately, or welded or otherwise secured to each other. As an alternative to this, however, it is generally more efficient to produce an orifice plate such as shown in FIG. 4, i.e. one plate with multiple.

What is claimed is:

1. A $CO_2$ snow generation system for forming a jet spray of carbon dioxide snow, said system comprising a source of liquid carbon dioxide, a nozzle having an assembly having an input aperture that mates with said source, a channel leading from said input aperture to an outlet aperture, and an orifice body disposed in said channel between said input aperture and said outlet aperture, said orifice body having a plurality of orifices each specifically sized to generate $CO_2$ snow.

2. The $CO_2$ snow generation system of claim 1, wherein said nozzle assembly comprises:
   a body having said input aperture and having an elongated tube extending toward an output end thereof and having a first axial hole having a predetermined depth disposed along an axis of the body adjacent the output end, and a centrally located second axial hole having a diameter that is smaller than the diameter of the first axial hole disposed through the remaining length of the body;
   said orifice body being an orifice disk disposed in the first axial hole adjacent the second axial hole; and
   an elongated nozzle tube disposed in the first axial hole so that it abuts the orifice disk and protrudes a predetermined length in front of the body whereby said carbon dioxide gas is converted to said carbon dioxide snow in said nozzle tube to provide said jet spray of carbon dioxide snow in a predetermined spray pattern.

3. The $CO_2$ snow generation system of claim 2 wherein the orifice disk has a circular pattern of orifices that provide a circular $CO_2$ spray pattern.

4. The $CO_2$ snow generation system of claim 2 wherein the orifice disk has a linear pattern of orifices that provide a linear $CO_2$ spray pattern.

5. The $CO_2$ snow generation system of claim 4 wherein the linear pattern of orifices comprises a changing density of orifices across the nozzle.

6. The $CO_2$ snow generation system of claim 2 wherein the orifice disk and nozzle tube are welded together to prevent leakage.

7. The $CO_2$ snow generation system of claim 2 wherein the orifice disk comprises laser drilled orifices.

8. The $CO_2$ snow generation system of claim 2 wherein the orifice disk comprises orifices formed by means of electron discharge machining.

9. The $CO_2$ snow generation system of claim 1, wherein said orifices have maximum diameters in the range of 0.003 to 0.008 inches.

10. A $CO_2$ snow generation system for forming a spray of carbon dioxide snow from carbon dioxide gas, said nozzle comprising:
    (a) a body having an input aperture for receiving carbon dioxide gas from a carbon dioxide gas source and having an axial hole extending therethrough;
    (b) an orifice member disposed within said axial hole in said body wherein said orifice member has a plurality of orifices in a predetermined pattern formed therein, said orifices each specifically sized to generate $CO_2$ snow; and
    (c) a nozzle tube abutting said orifice member and having a predetermined length and a predetermined geometry, whereby said predetermined pattern of said orifices, said predetermined geometry of said nozzle tube and said predetermined length of said nozzle tube provide said spray of carbon dioxide snow in a predetermined spray pattern.

11. The $CO_2$ snow generation system of claim 10 wherein said orifice member comprises an orifice disk having a circular cross-section and said predetermined pattern of said orifices comprises a circular pattern.

12. The $CO_2$ snow generation system of claim 10 wherein each of said orifices has a diameter within the range of about 0.003 to 0.008 inch.

13. The $CO_2$ snow generation system of claim 10 wherein said orifices comprise laser drilled orifices.

14. The $CO_2$ snow generation system of claim 10 wherein said orifices comprise electron discharge machined orifices.

15. A $CO_2$ snow generation apparatus for forming a spray of carbon dioxide snow from carbon dioxide gas, said apparatus comprising:
    (a) an input aperture for receiving carbon dioxide gas from a carbon dioxide gas source;
    (b) a manifold for distributing the carbon dioxide gas;
    (c) a plurality of orifice members that each have at least one orifice arranged in a predetermined elongated pattern, wherein each of said orifices is specifically sized to generate $CO_2$ snow; and
    (d) a plurality of nozzle members respectively abutting said plurality of orifice members that each have a predetermined length and a predetermined geometry;

whereby said predetermined elongated pattern of orifice members, said predetermined geometry of said respective nozzle members, and said predetermined lengths of said nozzle members provide a spray of carbon dioxide snow having a predetermined spray pattern.

16. The apparatus of claim 15 wherein said predetermined elongated pattern of orifice members and abutting nozzle members comprises a linear pattern and wherein each of said plurality of nozzle members comprise different diameter openings.

17. The apparatus of claim 15 wherein said predetermined elongated pattern of orifice members and abutting nozzle members comprises a linear pattern that has a changing density across the pattern, and wherein each of said nozzle members comprise openings having substantially the same diameter.

18. The apparatus of claim 15 wherein said predetermined elongated pattern of orifice members and abutting nozzle members comprises a plurality of linear patterns that have a changing density across the pattern, and wherein each of said nozzle members comprise openings having substantially the same diameter.

19. The apparatus of claim 15 wherein each of the plurality of orifice members has a circular pattern of orifices that provide a circular carbon dioxide spray pattern.

20. The apparatus of claim 15, wherein said orifices have maximum diameters in the range of 0.003 to 0.008 inches.

* * * * *